April 28, 1964     H. E. GATZKE     3,130,694

SEED PLANTING MACHINE

Filed July 31, 1962     2 Sheets-Sheet 1

INVENTOR.
HAROLD E. GATZKE
BY
Morsell + Morsell
ATTORNEYS

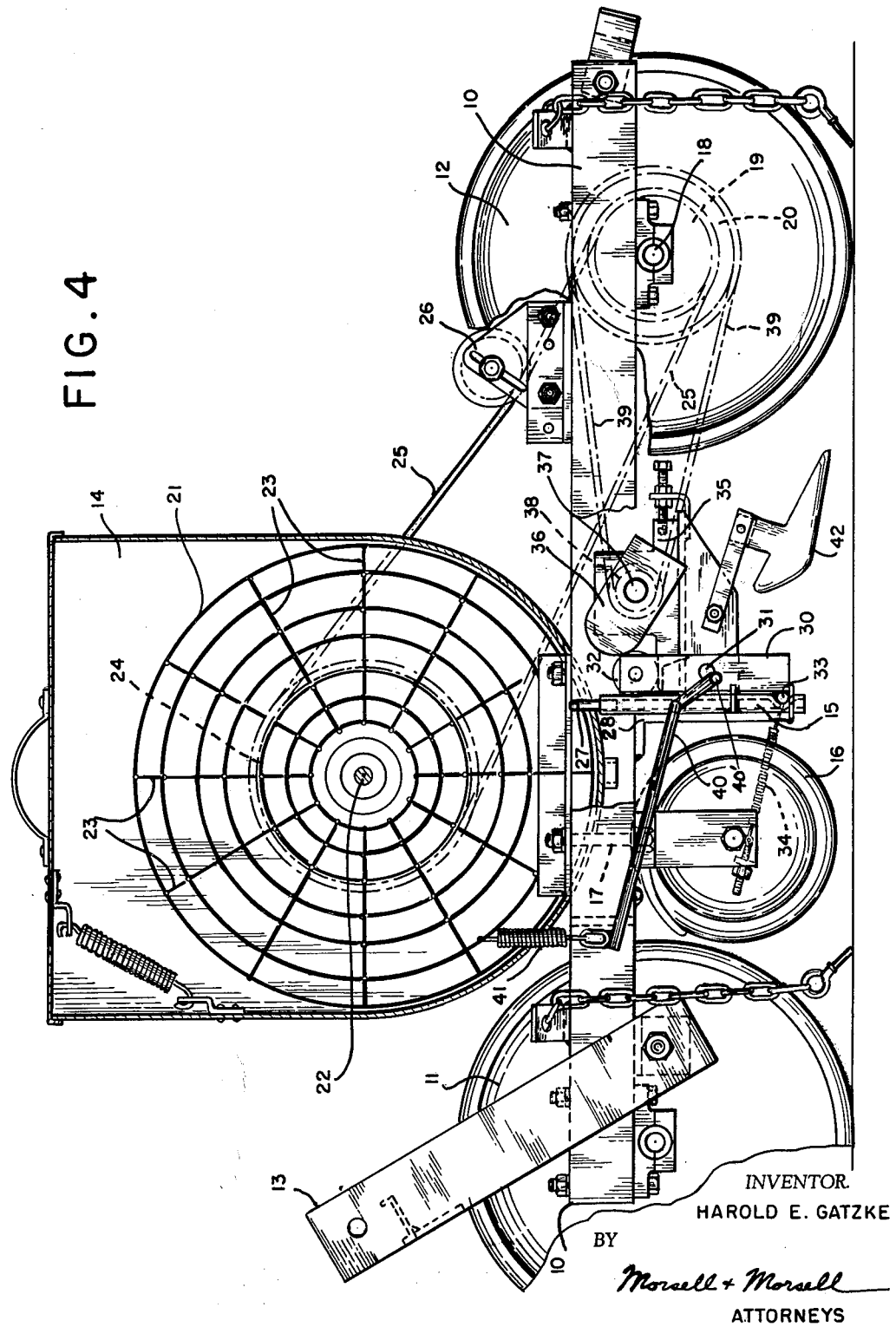

United States Patent Office 3,130,694
Patented Apr. 28, 1964

3,130,694
SEED PLANTING MACHINE
Harold E. Gatzke, Rte. 1, Berlin, Wis.
Filed July 31, 1962, Ser. No. 213,690
8 Claims. (Cl. 111—7)

This invention relates to improvements in the art of seed-planting, and more particularly to a novel machine for planting sprouted seeds.

It has long been recognized that the planting of vegetable and other seeds in a sprouted state is highly desirable, the term sprouted as used herein meaning a water-saturated seed which has started its germination process, and which has developed to the point where the sprout has or is about to emerge. Such pregerminated seeds, whereas in the initial growth development has taken place in the water, not only require a shorter growth period in the ground, but they are better able to survive adverse soil and weather conditions, and the proportion of grown plants is substantially greater than that obtained with ordinary seeds. Unfortunately, however, seeds in a sprouted state are necessarily in a soft, tender condition, and it has been found that conventional planting machines bruise such sensitive seeds and render the same unsuitable for planting. In fact, there is no known planting machine on the market today which is capable of successfully planting sprouted seeds. Moreover, of course, manual planting of the seeds is economically impractical.

With the above considerations in mind, one of the principal objects of the present invention is to provide a novel machine which is designed to plant seeds in a sprouted state, said machine including novel means for dispersing and maintaining said sprouted seeds in a suspended state in water or other liquid without damaging the same, and having means for depositing said seed-containing liquid in the ground.

A further object of the invention is to provide a novel seed-planting machine as described, having means therein for planting the liquid-entrained seeds in predetermined spaced relationship in the ground, which space planting substantially reduces the volume of seed required per acre, permits uniform growth of the plants, and greatly facilitates the task of thinning or culling of the planted crops.

Still further objects of the present invention are to provide an improved seed-planting machine which is relatively simple in design and construction, which is reliable in operation, which is readily adaptable for various planting requirements, and which machine is otherwise particularly well adapted for its intended purposes.

With the above and other objects in view, which other objects and advantages of the present structure will become apparent hereinafter, the invention consists of the improved means for and method of planting seeds, and all of the parts, combinations and steps as set forth in the claims, and all equivalents thereof.

In the accompanying drawings, wherein the same reference numerals designate the same parts in all of the views:

FIG. 4 is an enlarged side elevational view of the machine.

Figure 1:
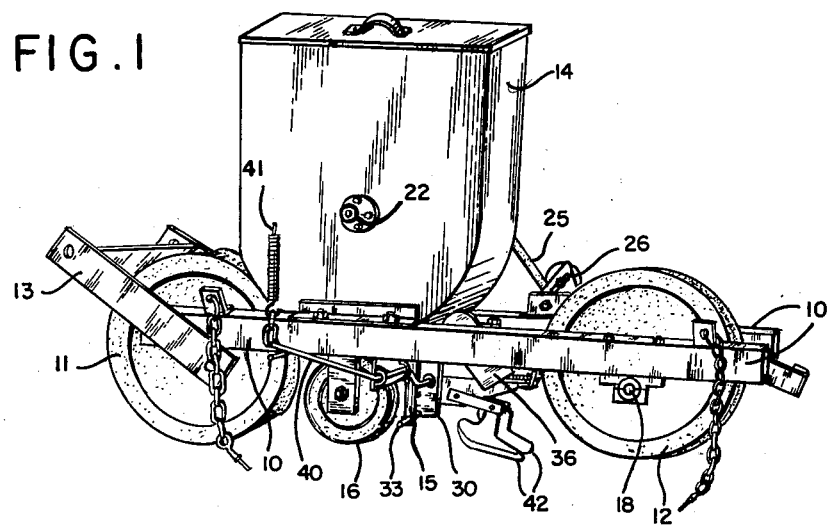
FIG. 1 is a perspective view showing one side of the improved planting machine featured in the present invention.

Referring now more particularly to the drawings, it will be seen that the general assembly of the improved seed-planting machine featured in the present invention includes a pair of parallel horizontal frame members 10, which are preferably formed of hollow steel to combine strength with lightness in weight, and carried by and between said bars is a forward, ground-engaging wheel 11 and an aligned rear ground wheel 12. Said frame includes suitable hitch means 13 on its forward end for securing the same to the rear of a tractor or other pulling vehicle. Mounted on and above an intermediate portion of said frame is an enlarged container or tank 14, in which the seed-entraining fluid employed in the invention is carried, said tank having a discharge tube 15 depending therefrom, and mounted beneath said tank is a wheel 16 which is adapted to form a furrow in the ground traversed by the machine.

In the general operation of the illustrated machine, the wheel 16 forms a continuous furrow in the earth, as described, and small quantities of a seed-containing liquid from the tank are intermittently deposited in said furrow, the machine then filling said furrow with a cover of dirt. As mentioned, with the present machine it is possible to plant seeds in a sprouted state, and in planting lettuce it has been found that seeds which have been allowed to germinate in water for approximately sixteen hours, and then exposed to air, provide excellent results. Herbicides or fungicides or the like can also be incorporated in the seed-containing liquid if desired.

Figure 2:
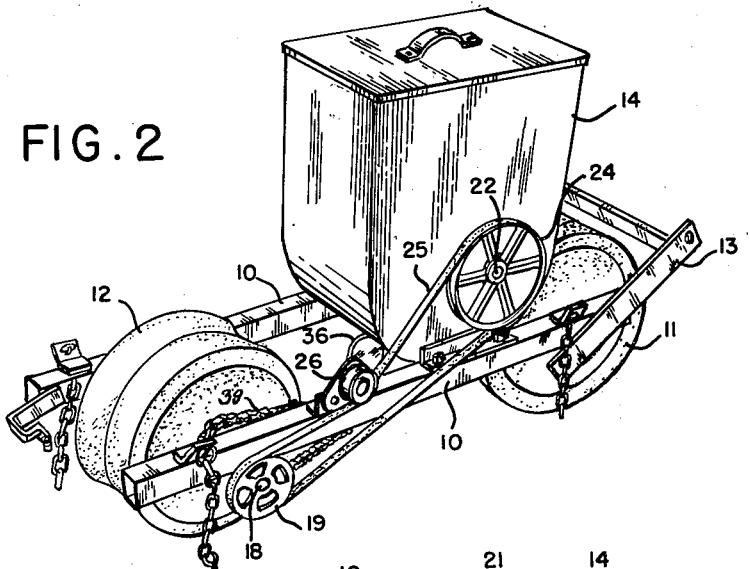
FIG. 2 is a perspective of the opposite side of the machine shown in FIG. 1.

With more particular reference now to the forward wheel 11, it will be seen in FIGS. 1 and 2 that said wheel preferably includes a rubber tire having a concave peripheral surface, there being about a one-half inch concavity. The purpose of said concave wheel contour is to eliminate packing of the soil immediately in front of the furrow-forming wheel 16 when the machine is in progress, thereby facilitating the job of said furrowing wheel. In addition, due to such contour the tire is substantially deformed while engaged against the ground, and as each succeeding wheel portion rotates out of engagement with the ground it resumes its original form with a force sufficient to eject dirt adhering thereto.

The furrow-forming wheel 16 has a convex peripheral surface and is mounted immediately behind said forward wheel 11, the central peripheral portion of said convex furrowing wheel depending slightly below the innermost peripheral portion of said concave wheel relative to the ground, so that said furrowing wheel will be in engagement with the ground when the machine is in transit. Said furrow-forming wheel is suspended from the frame by a bolt 17 or similar device which may be turned to raise and lower said wheel to obtain the exact desired furrow depth. Due to the convex nature of said furrowing wheel, the earth forming the furrow is tightly compacted thereby. This is advantageous for the reason that compacted dirt promotes the capillary action of water in the ground, and ensures the seeds receiving a sufficient supply of water during growth.

The rear ground wheel 12 in the present machine is mounted behind and in alignment with said front wheel 11 and furrow-forming wheel 16, and is provided with an axle 18 having a sheave 19 and a sprocket 20 thereon, the function of which will be seen. Like the front wheel 11, the periphery of said rear wheel is preferably concave in form to provide automatic purging of dirt therefrom. Moreover, after the seeds have been deposited in the furrow, as will be described, the present machine provides means for filling said furrow with dirt, and the concave contour of said rear wheel prevents said wheel from compacting the dirt fill too tightly as it passes thereover. While it is advantageous to have the earth on the underside of the furrow compacted, to provide maximum capillary action, it is desirable that the dirt cover on top of said seeds be relatively loose to permit the young seeds to obtain oxygen from the air.

With reference now to the supply tank 14 for the seed-containing liquid, it will be seen that said tank is generally rectangular in form but is provided with a semi-circular lower portion, and a removable top cover. It has been found that a fourteen-gallon capacity tank is satisfactory for most purposes, but the size of said tank can be varied as desired, of course, and the invention is not to be limited in this respect. Similarly, while the illustrated machine is intended for the planting of lettuce seeds, and the gear ratios, etc. are specifically designed for this purpose, it is to be understood that the machine is adaptable for planting any kind of crop, and the invention is intended to include not only the illustrated machine, but also any and all modifications thereof which come within the spirit of said invention.

Figure 3:
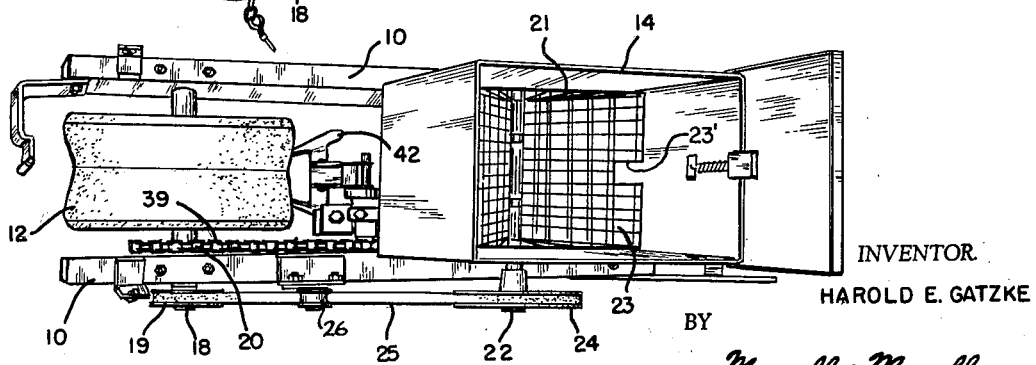
FIG. 3 is a top perspective view of the machine.

Rotatably mounted within said tank 14 is an agitator 21 having a plurality of radial, laterally-extending arms of paddles 23 formed of relatively large mesh wire screening (approximately 1"), said agitator being mounted on a rotatable shaft 22 journaled in the side walls of said container, and there being suitable liquid-tight seals therefor. In the present invention predetermined quantities of seeds and water are introduced into the tank 14, the ratio of seeds to water depending upon the particular planting operation, and it is essential that said seeds are maintained in a suspended state therein. Moreover, when sprouted seeds are being planted it is critical that the agitator does not bruise or injure the same. In this respect, it has been found that the wire screening forming the agitator paddles performs excellently in thoroughly dispersing said seeds throughout the liquid without damaging said tender seeds. As will be seen in FIG. 3 of the drawings, the mesh is formed of spaced parallel strands arranged parallel to the longitudinal axis of the shaft 22, and intermeshing, spaced parallel strands arranged transversely to said shaft axis. It has been found that if the strands are arranged on a bias relative to said shaft axis an undesirable screw action results which tends to urge all of the seeds toward one side of the conveyor, thus preventing the uniform dispersion of said seeds throughout the tank.

Due to the multiplicity of relatively large openings through said paddles, a portion of the suspended seeds pass through said paddles as the latter turn through the water. Thus there is provided a two-directional movement of said seeds, transversely to the plane of said paddles, which promotes the thorough and uniform distribution of the seeds throughout the liquid. The openings in said paddles, and the resulting relatively small solid frame areas provided thereby is also important in that it minimizes the possibility of the tender, sprouted seeds being struck by said moving paddles, and injured thereby.

As best appears in FIG. 4, the paddles 23 project radially outwardly to a point immediately adjacent the container wall. The purpose of this design is to ensure that the entire seed content of the tank is acted upon by said dispersing means, thus promoting the complete and uniform distribution of the seeds throughout said tank.

Mounted on one end of said agitator shaft 22 externally of the tank wall is a sheave 24 and trained thereabout, and about the aforementioned sheave 19 on the rear wheel axle, is a V-belt 25, thus rotatably drivably connecting said agitator to the rear ground wheel 12. An adjustable bracket and idler assembly 26 on the frame is designed to bear against said V-belt and can be adjusted relative thereto to obtain the desired belt tension. In the illustrated machine, the ratio between said agitator and rear wheel sheaves is such that the agitator rotates at 22 r.p.m. when the machine is being towed at approximately 2 m.p.h. As mentioned, however, this ratio may be varied as required for particular planting requirements.

As appears in FIG. 4, a copper pipe 27 is mounted in and projects upwardly through the bottom wall of said tank 14 a short distance, said upward projection preventing sludge or the like which settles on the container bottom from entering said pipe, and there being cutouts 23' (FIG. 3) in said agitator paddles to accommodate the same, and surrounding the exterior portion of said pipe 27 and depending substantially therebelow is the discharge tube 15. Said tube is preferably formed of surgical live gum rubber or similar extremely flexible rubber-like material, and is positioned against the flat, vertical face of a rigid bracket 28 depending from the frame.

Mounted to the rear and adjacent said flexible discharge tube 15 is an arm member 30 which is pivotally mounted on a transverse shaft 31 at its approximate longitudinal midpoint. The upper portion of said arm is provided with a roller 32 and the lower portion of said arm has a forward protrusion formed by a transverse pin 33 which is adapted to bear against the lower end of the flexible rubber tube 15 when said arm is in its normal, vertical position, said protrusion pinching said tube against the face of the rigid bracket 28 to seal the same and prevent flow of the seed-containing liquid from the tank. Connected to said arm 30 and to the fork of the furrowing wheel 16 is an expansion spring 34 which is adapted to yieldably maintain said arm in its tube-closing position.

Mounted on a bracket 35 behind said pivotal arm member 30 is an eccentric cam 36 which is rotatably carried on a transverse shaft 37, said cam-supporting bracket being longitudinally adjustable on the frame. Said cam is so positioned relative to said pivotal arm member 30 that the eccentric cam face is brought into engagement with the roller 32 on the upper end of said arm every time said cam is revolved 360°, thus intermittently rocking said arm about its axis (said arm having about a ⅜" travel) against the tension of the spring 34. The pin 33 is thereby swung away from its normal, tube-closing position, and a quantity of the seed-containing liquid is intermittently deposited in the furrow. Said cam shaft 37 has a sprocket 38 on one end thereof and trained thereabout, and about the aforementioned sprocket 20 on the rear ground wheel is a drive chain 39. Thus, when the machine is in transit, the rear wheel 12 not only drives the agitator 21, as hereinabove described, but said rear wheel is also geared to and actuates the seed discharge control mechanism.

In the illustrated form of the invention, the eccentric cam 36 rotates approximately three times per second when the machine is being towed at about 2 m.p.h., resulting in the discharge tube being opened, and a small quantity of the seed-containing liquid deposited in the furrow, every fourteen inches or so.

As is shown in FIG. 4, mounted adjacent the discharge tube 15 is an elongated lever 40 having lug means 40' thereon engageable with said flexible discharge tube intermediate its length. Said lever can be pivotally moved into and out of closing engagement with the tube, and includes a spring 41 or the like on its forward end leading to a handle (not shown), whereby the operator can close said tube to stop the planting operation at any time.

Mounted on the frame behind the discharge tube 15 is a furrow-closing mechanism preferably formed of a pair of plow-like shoes 42 which are mounted at an angle (FIG. 3) to direct dirt into the furrow after the seeds have been deposited therein. As mentioned, the concave rear wheel 12 also cooperates in the covering of said furrow and functions to smooth the same out without compacting the dirt.

From the foregoing, it will be seen that the present invention comprises a novel method of planting, and a machine for accomplishing the same, whereby the seeds to be planted are first allowed to germinate in water to the point where the sprout has or is about to emerge, the machine including agitator means to maintain said seeds evenly dispersed throughout the liquid, and the planting is accomplished by discharging the seed-entraining liquid into the ground. It has been found that this novel planting method has several important advantages over the conventional system, wherein dry seeds are planted. With the present invention it is not only possible to plant a greatly increased acreage per pound of seed, but the plants may be accurately spaced relative to each other, through the cam-actuated discharge mechanism hereinabove described.

The usual method of planting is to merely deposit seeds in the furrow more or less continuously, rather than to try to space the same, and the result is that a majority of the young plants have to be manually pulled out in order to obtain sufficient spacing between plants for proper growth. This is not only wasteful, but necessitates substantial labor costs. Moreover, such manual spacing is usually inaccurate and it is unlikely that all of the plants will have an equal area in which to grow, as is ensured with the accurate spacing provided by the present machine.

With the present invention, each shot or quantity of seed-containing liquid discharged into the furrow contains about three or four seeds, and as the young plants protrude from the ground it is relatively simple for the workmen to cull the same and it is natural for them to leave the largest, healthiest plant in each group. Thus, not only are fewer plants wasted, but the remaining plants are the largest, which is not usually true with the conventional thinning or culling method, and all of the plants in a field are of approximately uniform size. The latter feature greatly facilitates the job of the grader and packer, and effects additional substantial savings. A further advantage of uniform plant size is that the growth period is also uniform, thus permitting the harvesting of an entire field at one time, and which is particularly important with crops such as lettuce wherein even a twenty-four hour emergence difference can be critical.

It is to be understood, of course, that while accurate space planting is one of the important features attributable to the present machine, the unit can also be used to advantage in continuous-row planting. For this purpose the chain drive to the cam-actuated intermittent discharge mechanism can be disconnected, and the discharge tube allowed to remain in an open condition while the machine traverses the field.

As a modified form of the present invention, it is contemplated that a double unit can be employed, including two discharge tubes and alternately-operating opening mechanisms. Such a machine could simultaneously plant a double row of alternately-spaced seeds in a bed, and would be particularly well suited for use in the western and southern areas of the United States, wherein double rows are ordinarily planted between irrigation channels. It is further contemplated that the machine featured in the present invention could be equipped with three or more discharge members for use in planting certain crops such as carrots and onions, wherein it is desirable to have several rows in close proximity to each other.

From the foregoing details description, it will be seen that the present invention provides a novel machine for and method of planting which has numerous advantages over conventional seed-planting machines and methods. As mentioned, it is to be clearly understood that the invention is intended to include not only the planting means and method hereinabove described, but also any and all modifications or changes therein as may come within the spirit of said invention and within the scope of the following claims.

What I claim is:
1. In a machine for planting seeds in a furrow in the ground, the improvement comprising: a portable tank having opposed side walls and containing a liquid with seeds therein; an agitator mounted in said tank including movable paddle means arranged to extend substantially between said opposed tank walls and having a plurality of openings of a size permitting said seeds to pass therethrough; means for actuating said movable paddle means to agitate said liquid to maintain said seeds in a state of suspension therein, said paddle openings permitting the uniform dispersion of said seeds throughout the tank; a discharge tube communicating with the interior of said tank and positionable in alignment with a furrow in the ground; and means for opening and closing said discharge tube to permit said seed-containing liquid to flow by gravity from said tank.

2. A machine as recited in claim 1 wherein said tube opening and closing means is provided with a cam-actuated mechanism adapted to intermittently open and close said discharge tube at predetermined intervals.

3. In a machine for planting seeds in a furrow in the ground, the improvement comprising: a portable tank containing a liquid with seeds therein, said tank having side and bottom walls; an agitator mounted in said tank, said agitator having a rotatable shaft with a plurality of paddles spaced around and projecting substantially radially therefrom, the major surface portions of said paddles having openings therethrough of a size permitting said seeds to pass through said paddles; means for driving said rotatable shaft and paddles to agitate said liquid and to maintain said seeds in a state of suspension therein, said paddle openings permitting the uniform dispersion of said seeds throughout the tank; a discharge tube communicating with the interior of said tank and positionable in alignment with a furrow in the ground; and means for opening and closing said discharge tube to permit said seed-containing liquid to flow from said tank.

4. A machine as recited in claim 3 wherein said paddles are constructed of mesh screen material formed of spaced strands arranged parallel to the longitudinal axis of said shaft, and spaced intermeshing strands arranged at a right angle thereto.

5. A machine as recited in claim 3 wherein said paddles are positioned to project outwardly from said shaft to a point immediately adjacent said container walls.

6. A machine as recited in claim 5 wherein said container bottom wall is formed on the arc of a curve.

7. A machine as recited in claim 6 wherein said discharge tube projects upwardly through said tank bottom wall to a point spaced above said bottom wall, and wherein said rotatable paddles are provided with cutout portions in alignment with said upwardly-projecting tube portion.

8. A machine as recited in claim 3 wherein said tube opening and closing means includes an adjustable cam-actuated mechanism adapted to intermittently open and close said tube at predetermined intervals.

References Cited in the file of this patent

UNITED STATES PATENTS

| | | |
|---|---|---|
| 112,333 | Godfrey | Mar. 7, 1871 |
| 1,882,377 | Whittelsey | Oct. 11, 1932 |
| 2,192,947 | White | Mar. 12, 1940 |
| 2,346,330 | Ratcliff | Apr. 11, 1944 |
| 2,364,958 | Drenman | Dec. 12, 1944 |
| 2,557,419 | Edwards | June 19, 1951 |
| 2,620,757 | Ahlen | Dec. 9, 1952 |
| 2,703,517 | Hooper | Mar. 8, 1955 |
| 2,768,773 | Bjerre | Oct. 30, 1956 |
| 2,802,435 | Maxwell | Aug. 13, 1957 |
| 2,842,899 | Padrick | July 15, 1958 |
| 2,859,718 | Barkley | Nov. 11, 1958 |
| 2,878,617 | Finn | Mar. 24, 1959 |
| 2,894,873 | Seven | July 14, 1959 |
| 2,954,643 | Porter | Oct. 4, 1960 |
| 2,968,266 | Gustafson | Jan. 17, 1961 |
| 2,981,213 | ONeil | Apr. 25, 1961 |

FOREIGN PATENTS

| | | |
|---|---|---|
| 448,388 | Canada | May 11, 1948 |